US009878955B2

United States Patent
Engel

(10) Patent No.: US 9,878,955 B2
(45) Date of Patent: Jan. 30, 2018

(54) CERAMIC MATERIAL AND CAPACITOR COMPRISED THEREOF

(71) Applicant: Guenter Engel, Leibnitz (AT)

(72) Inventor: Guenter Engel, Leibnitz (AT)

( * ) Notice: Subject to any disclaimer, the term of this patent is extended or adjusted under 35 U.S.C. 154(b) by 0 days.

(21) Appl. No.: 15/112,917

(22) PCT Filed: Feb. 13, 2015

(86) PCT No.: PCT/AT2015/050044
§ 371 (c)(1),
(2) Date: Jul. 20, 2016

(87) PCT Pub. No.: WO2015/120501
PCT Pub. Date: Aug. 20, 2015

(65) Prior Publication Data
US 2016/0340258 A1 Nov. 24, 2016

(30) Foreign Application Priority Data

Feb. 17, 2014 (AT) .............................. A 50116/2014

(51) Int. Cl.
| | |
|---|---|
| *C04B 35/491* | (2006.01) |
| *H01G 4/12* | (2006.01) |
| *C04B 35/472* | (2006.01) |
| *C04B 35/493* | (2006.01) |
| *H01G 4/30* | (2006.01) |
| *H01G 4/008* | (2006.01) |

(52) U.S. Cl.
CPC .......... *C04B 35/491* (2013.01); *C04B 35/472* (2013.01); *C04B 35/493* (2013.01); *H01G 4/008* (2013.01); *H01G 4/1236* (2013.01); *H01G 4/1245* (2013.01); *H01G 4/30* (2013.01); *C04B 2235/3201* (2013.01); *C04B 2235/3203* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3227* (2013.01); *C04B 2235/3249* (2013.01); *C04B 2235/3291* (2013.01); *C04B 2235/768* (2013.01); *C04B 2235/79* (2013.01)

(58) Field of Classification Search
CPC ........................... C04B 35/491; H01G 4/1245
See application file for complete search history.

(56) References Cited

U.S. PATENT DOCUMENTS

| | | | | |
|---|---|---|---|---|
| 5,164,882 A | * | 11/1992 | Kanai | ................... H01G 4/1245 264/615 |
| 7,494,602 B2 | * | 2/2009 | Liufu | ..................... C04B 35/493 252/62.9 PZ |
| 7,781,358 B2 | | 8/2010 | Hackenberger et al. | |
| 9,293,256 B2 | * | 3/2016 | Engel | ........................ H01G 4/30 |
| 9,627,141 B2 | * | 4/2017 | Engel | ........................ H01G 4/30 |
| 2009/0207555 A1 | | 8/2009 | Hackenberger et al. | |
| 2013/0107418 A1 | * | 5/2013 | Nakamura | ........... C04B 35/4682 361/301.4 |
| 2015/0103466 A1 | * | 4/2015 | Engel | ........................ H01G 4/30 361/301.4 |
| 2015/0131200 A1 | * | 5/2015 | Engel | ........................ H01G 4/30 361/301.4 |

FOREIGN PATENT DOCUMENTS

| | | | |
|---|---|---|---|
| JP | 04331770 | * | 11/1992 |
| JP | 05116947 | * | 5/1993 |
| WO | 2013/152887 | | 10/2013 |

OTHER PUBLICATIONS

Kanai et al "Dielectric Properties of (Pb1-xXx)(Zr.7Ti.3)O3 (X=Ca,Sr,Ba) Ceramics", J. Am. Ceram. Soc. 77 [10] 2620-24 1994.*
Campbell et al., "IEEE Transactions on Component and Packaging Technologies", vol. 25, No. 2, Jun. 2002, pp. 211-216.
Chen et al., "Study on Slim-loop ferroelectric ceramics for high-power pulse capacitors," Acta Physica Sinica, vol. 57, No. 11, Nov. 30, 2008, pp. 7298-7304.
Kanai et al., "Dielectric properties of (PB1-XXX) (ZR0.7TI0.3)O3 (X=Ca, Sr, Ba) Ceramics", Journal of the American Ceramic Society, Blackwell Publishing, Malden, MA, US, vol. 77, No. 10, Oct. 1, 1994, pp. 2620-2624.
Dipti et al., "Study on structural, dielectric, ferroelectric and piezo-electric properties of Ba doped Lead Zirconate Titanate Ceramics", Physica B. Condensed Matter, vol. 431, Sep. 14, 2013, pp. 109-114.
Yu et al., "Phase Stability and Ferroelectric Properties of Lead Strontium Zirconate Titanate Ceramics", Journal of the American Ceramic Society, vol. 84, No. 2, Feb. 20, 2001, pp. 333-340.
Yoon et al., "Dielectric and field-induced strain behaviour of (Pb 1!x Ba x) Zro 3 Ceramics", Journal of Mate Rials Science, Jan. 1, 1997, pp. 17-21.
Yu, "Electrical properties and electric field-induced antifer-roelectric-ferroelectric phase transition in Nd[sup 3+]-doped lead strontium zirconate titanate?ceramics", Journal of Applied Physics, vol. 94, No. 11, Jan. 1, 2003, pp. 7250.

* cited by examiner

*Primary Examiner* — Karl E Group
(74) *Attorney, Agent, or Firm* — Greenblum & Bernstein, P.L.C.

(57) ABSTRACT

The invention relates to a ceramic material for capacitors. In order to achieve reduced self-heating on assembly of the material into multilayer capacitors with antiferroelectric properties and a high dielectric constant, a ceramic material of formula $[Pb_{(1-r)}(Ba_xSr_yCa_z)_r]_{(1-1.5a-1.5b-0.5c)}(X_aY_b)A_c(Zr_{1-d}Ti_d)O_3$ is proposed, where X and Y both represent a rare metal earth selected from the group consisting of La, Nd, Y, Eu, Gd, Tb, Dy, Ho, Er and/or Yb; where A represents a monovalent ion; $x+y+z=1$; x and/or y and/or $z>0$; $0<r<0.3$; $0<d<1$; $0<a<0.2$; $0<b<0.2$; $0<c<0.2$.

13 Claims, No Drawings

CERAMIC MATERIAL AND CAPACITOR COMPRISED THEREOF

The invention relates to a ceramic material.

Furthermore, the invention relates to the use of a material of this type.

Finally, the invention also comprises a capacitor, in particular a multilayer capacitor.

Capacitors are used in many areas of electrical engineering, for example in AC/DC converters for motor drives and, for example, for increasing voltage, decreasing voltage and/or stabilizing voltage in DC/DC circuits. In applications of this type, semiconductor switches with diodes (referred to as an "inverter circuit") and an additional circuit are often provided, wherein a capacitor is arranged between these circuits, which capacitor is also referred to as an intermediate circuit capacitor. Series or parallel connections of multiple capacitors are thereby also possible for the purpose of increasing voltage parameters and current parameters.

In the case of the intermediate circuit capacitors mentioned, the capacitor arranged between the additional circuits has the task of keeping the intermediate circuit voltage constant during both rapidly occurring and also quantitatively significant changes in the operating variables current and voltage. The problem thereby occurs generally that, as a result of the capacitor's environment, the possibilities for a design of the capacitor are limited by the semiconductors and by requirements arising from the substrate and necessary leads. In this context, it is particularly problematic that desired ideal parameters for capacitors are accompanied and/or influenced by less-than-ideal secondary properties in circuits with semiconductor elements, which properties can significantly affect the limits of a design. These limiting secondary properties are also referred to as "parasitic" secondary properties.

For semiconductors, several classes of different components exist, each of which has specific advantages and disadvantages. Semiconductor switches based on silicon are known, for example an isolated gate bipolar transistor (IGBT) or a metal oxide semiconductor field effect transistor MOSFET), and corresponding components with other base material in place of silicon, such as gallium arsenide (GaAs), gallium nitride (GaN) or silicon carbide (SiC) in particular. All aforementioned components, despite specific advantages, share the parasitic properties mentioned. These properties are mostly complimentary to the respectively desired function. For example, there results in the case of a desired rapid switching of high currents via the known formula $$U = -L \, dI/dt$$

a rapid switching operation (small dt) of a high current (large dI), even in the case of low inductance L, which is made up of the self-inductance and the line inductances, and a high (over)voltage which can cause the semiconductor to self-destruct. Accordingly, appropriate design measures and countermeasures are necessary if a requirement of this type is to be dealt with permanently. To solve this problem, the intermediate circuit capacitor is typically oversized in order to cut off overvoltages on the one hand and, on the other hand, compensate the reduced charging/discharging rates of the gate capacitances of the semiconductors caused by the parasitic series resistances. The environment in the application thus determines the design of the capacitor.

Another parasitic property is leakage currents, which virtually always lead to considerable temperature increases that must be limited to a certain allowable magnitude. Although it is precisely semiconductors that are in this regard very sturdy and particularly efficient at higher temperatures, excessive temperatures and/or repeated material-stressing temperature changes can ultimately cause material damage in those elements, or at least limit the service life thereof, that connect to the semiconductor or are located proximately thereto, such as the substrate or connection elements, and also in particular capacitors.

With regard to thermal stability, capacitors have narrow limits that apply particularly in the case of high currents and voltages. Since leakage currents increase and breakdown voltages decrease with increasing temperature for all capacitor technologies, this must also be taken into account for the design. As a result of the heat production by the semiconductors in a circuit, and because of the capacitors' own contribution to the temperature increase, it has previously also been necessary, in addition to the oversizing already necessary in any case, to position the capacitors at a certain distance from the semiconductors to enable an effective cooling and thus the adherence to a predetermined temperature range. However, as a result of this spacing, the required longer electrical connections always have a corresponding inductance, which is counterproductive in terms of the above formula and necessitates an additional oversizing of the capacitor.

From the prior art, various capacitor technologies are known, in particular ceramic multilayer capacitors, aluminum electrolytic capacitors, and metalized film capacitors. As evaluative parameters for the particular use purpose, specifically capacitance, voltage, ripple current, equivalent series resistance, loss factor, frequency response, capacitance stability and voltage derating are used, as are temperature behavior, reliability, energy density and cost. In light of these evaluative parameters and criteria, aluminum electrolytic capacitors and metalized film capacitors are used primarily in the power range starting at approximately 1 kW, while ceramic capacitors are used in the power range lying below said range.

The general trend towards the miniaturization of components also applies to electromobility, and therefore also to components such as the aforementioned AC/DC converters for motor drives. There is a demand for electronic components in the related inverters to be designed to be significantly smaller and more efficient. With regard to capacitors, it is maintained that the properties of ceramic multilayer capacitors would be advantageous over aluminum electrolytic capacitors or metalized film capacitors if the capacitance of the X7R capacitors to be used did not decrease with increasing voltage at the required high voltages in inverters (M. März, ECPE Automotive Power Electronics Roadmap, ECPE-HOPE Symposium Automotive Power Electronics, Sindelfingen, 7 to 8 Oct. 2008). At, for example, typical voltages of approximately 400 V, the capacitance thus decreases to, for example, 25% of the rated value; additionally, the energy storage take places solely via the electrical field strength, with the addition of hardly any polarization components. However, materials are known in which the capacitance initially increases, reaches a maximum value and only then decreases again (U.S. Pat. No. 7,781,358; C. K. Campell et al., IEEE Transactions on Component and Packaging Technologies, Vol. 25 (2), 2002, 211). For the operating voltages, the energy storage also occurs to a high degree via polarization energy. A high available capacitance density in application conditions thereby proves to be a significant advantage, which is contrary to conventional ceramic capacitors. As a significant disadvantage, however, the extremely expensive precious metal palladium or a silver/palladium alloy is used as an inner electrode for these materials, which is acceptable for individual applications, such as in medical devices, but is incompatible with a broader economical application.

In place of palladium or a silver/palladium alloy, it has recently become possible to also use copper for inner electrodes by adapting the composition of a ceramic material in capacitors (WO 2013/152887 A1). Capacitors of this type exhibit excellent high frequency properties. In addition, copper is cost-effective. Corresponding multilayer capacitors having copper as an inner electrode and a ceramic base component on the basis of lead zirconium titanate (PZT) are also already in use in electronics where high performance is required. The problem of self-warming, however, still remains.

Based on the prior art presented, the object of the invention is to specify a ceramic material that has a high dielectric constant and is suitable for the production of capacitors with low self-warming, in particular multilayer capacitors, that can thus be arranged in immediate proximity to semiconductors.

Furthermore, the object of the invention is to illustrate a use of a material of this type.

Finally, the object of the invention is to specify a capacitor that has low self-warming with high performance during use.

The first object is attained by a ceramic material which has the formula

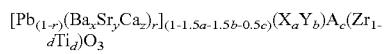

wherein

X and Y are respectively a rare earth metal selected from the group comprising lanthanum (La), neodymium (Nd), yttrium (Y), europium (Eu), gadolinium (Gd), terbium (Tb), dysprosium (Dy), holmium (Ho), erbium (Er) and/or ytterbium (Yb);

A represents a monovalent ion;
$x+y+z=1$;
x and/or y and/or $z>0$;
$0<r\leq 0.3$;
$0\leq d\leq 1$;
$0\leq a\leq 0.2$;
$0\leq b\leq 0.2$;
$0\leq c\leq 0.2$.

The conceptual scope of the invention includes the idea that the self-warming in the ceramic material during use in a capacitor can be reduced in that the charging/discharging operation is facilitated. The point of origin for this idea is that, in an antiferroelectric material, the dielectric displacement depends on the structural state of the capacitor material, and that the macroscopic polarization is carried over to the microscopic alignment of ionic units and vice versa. In this scenario, a charging or discharging operation can be viewed as a polarization wave, the carriers of which are lattice vibrations of the polarized lattice. These lattice vibrations are structure-dependent and have specific frequencies and energy densities. The basic structure for antiferroelectric materials according to the prior art is thereby a perovskite structure of the type $ABO_3$ with titanate octahedra linked at the vertices, wherein the low-energy lattice vibrations constitute in the first approximation a coupled tilt/turn vibration of said octahedra. Depending on the state of the ceramic, the tilt angles of the octahedra determine the respective phase state (antiferroelectric, ferroelectric or paraelectric). The magnitude of the dielectric constant and of the loss angle correspond to the vibration amplitude and the vibration damping, respectively.

According to the considerations, it is precisely these collective lattice vibrations that should be more easily excitable at the structural level, which constitutes a first aspect of the theoretical considerations.

A second aspect of the considerations is the desired use of cost-effective copper inner electrodes in multilayer capacitors. For these capacitors, the problem that only a low sintering temperature is permissible must additionally be overcome. The defect structures necessary therefor in order to facilitate sintering by means of sintering aids, however, can only be modified within narrow limits in terms of composition. For this purpose, monovalent doping ions are used according to the prior art, which ions are introduced to roughly such an extent that the ions critical to the antiferroelectric phase are compensated with respect to valence. As part of the invention, it has now been found that a targeted control of the lattice dynamics opens up the possibility of lowering the self-warming while retaining the typical sintering aids. The invention is based on the concept that a self-warming will be lowest when the tilt/turn vibrations have an energetically flat progression around a position of rest. Applied to a perovskite structure, this means that a structural phase transition can be approximated. According to the invention, this is achieved by a partial substitution of barium (Ba) for the lead (Pb). In a further embodiment, lattice spaces can be compensated with strontium (Sr) and calcium (Ca). However, because a structural phase change would prevent the formation of an antiferroelectric phase, for which reason the phase transition can only be approximated, the Ba, Sr and Ca contents must be adjusted so that $0<r\leq 0.3$.

The practical implementation of the aforementioned considerations shows that, through the partial substitution of Pb with Ba, Sr and/or Ca, the structure of the antiferroelectric ceramic material can be adjusted such that, on the one hand, a self-warming during use in a capacitor is significantly reduced and, on the other hand, the preferred copper inner electrodes can be used for applications in multilayer capacitors. Tin (Sn), which could also replace Ba, is not provided, since even though it would be possible to lower the self-warming with Sn, the likewise desired sinterability with the use of copper inner electrodes is in this case not ensured.

For an advantageous influencing of the lattice or formation of the material according to the invention, $0.01\leq r\leq 0.2$ is preferred.

It is particularly preferred that the ceramic material is embodied with the values of
$0.01\leq x<1$;
$0\leq y\leq 0.99$;
$0\leq z\leq 0.2$.

If Ba is necessarily provided, a low self-warming of the material during use in a capacitor results due to an optimized structure. This is further enhanced by a possible presence of Sr and Ca for the optimization of lattice spaces.

If only Ba is provided, the material is embodied with
y and $z=0$;
$0.1\leq r\leq 0.2$.

If an embodiment with $0<y\leq 0.99$ is provided, wherein a Ba content is greater than the Sr content, a loss angle of a multilayer capacitor, and therefore a self-heating, can be minimized particularly effectively.

For a further enhancement, the presence of both Ba and also Sr and/or Ca can be provided,
wherein
$0.01\leq x<1$;
$0<y\leq 0.99$;
$0<z\leq 0.2$.

As a result, a loss angle and therefore a self-warming during a use of the material in a multilayer capacitor can be reduced by up to 80%. With respect to the zirconium (Zr) and titanium (Ti) contents, the preferred specification is that $0.01 \leq d \leq 0.70$, in particular $0.03 \leq d \leq 0.52$.

The monovalent ion A is not critical per se, but is preferably selected from the group comprising sodium (Na), potassium (K), lithium (Li) and/or silver (Ag), wherein Na has proven to be particularly useful for lowering the sintering temperature, and thus for the sinterability with copper inner electrodes. The monovalent ion A, in particular Na, can be present at low contents of 3% to 7% or with $0.03 \leq c \leq 0.07$, preferably $0.04 \leq c \leq 0.06$. Corresponding contents are already sufficient to lower the sintering temperature to maximally 1050° C., which represents the maximum temperature for sintering when using copper inner electrodes. Among the monovalent ions, Na, K and Li are highly preferred to Ag, wherein above all Na proves particularly suitable.

As a rare earth metal, preferably lanthanum (La) is used alone or in combination with neodymium (Nd). In the perovskite structure, which can generally be denoted by $ABO_3$, wherein A and B represent A spaces and B spaces, respectively, the rare earth metals occupy A spaces in place of the Pb. Since La and ND are trivalent, like the other rare earth metals mentioned, this is a donor doping that is compensated by an acceptor doping with the monovalent ion A. This co-doping is favorable for a highest possible dielectric constant. La is particularly preferred, wherein an advantageous content having $0.04 \leq a \leq 0.18$, in particular $0.04 \leq a \leq 0.16$, for example $0.04 \leq a \leq 0.07$, can be provided. In this case, Nd can be omitted, so that b=0.

According to the advantages illustrated above of a ceramic material according to the invention, said material is preferably used in a capacitor, in particular a multilayer capacitor.

The invention is explained below in greater detail with the aid of exemplary embodiments.

The ceramic materials described below can be obtained using classic mixed oxide processes by sintering precursors based on, for example, oxides, acetates, nitrates and/or carbonates in the temperature range of 1000° C. to 1150° C. Alternatively, sol-gel processes can also be used to initially form a sol from solutions of acetates and/or alkoxides of the metals, which sol is converted into the final ceramic materials by means of drying and subsequent calcination.

The examples listed below in Table 1 were produced according to the mixed oxide method, wherein the general formula of the antiferroelectric material created is as follows:

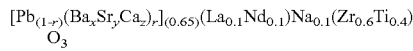

$[Pb_{(1-r)}(Ba_xSr_yCa_z)_r]_{(0.65)}(La_{0.1}Nd_{0.1})Na_{0.1}(Zr_{0.6}Ti_{0.4}) O_3$

Ba, Sr and/or Ca, in differing contents, make up part of the starting materials that are to be sintered and are in this manner introduced into the final material.

TABLE 1

Exemplary embodiments

| Example | r | x (Ba) | y (Sr) | z (Ca) | Loss angle reduction [%] |
|---|---|---|---|---|---|
| 1 | 0.2 | 1.0 | 0.0 | 0.0 | 70 |
| 2 | 0.15 | 0.66 | 0.34 | 0.0 | 80 |
| 3 | 0.15 | 0.66 | 0.27 | 0.07 | 80 |

As follows from Table 1, the loss angle can be reduced by 70% to 80% through the admixture of Ba, Sr and/or Ca, which results in a corresponding reduction in the self-warming of the material when used in a multilayer capacitor.

Similar results can also be obtained if the Zr and Ti contents are modified and the general formula for the ceramic material with a Ba, Sr and/or Ca substitution is, for example, as follows:

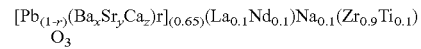

$[Pb_{(1-r)}(Ba_xSr_yCa_z)r]_{(0.65)}(La_{0.1}Nd_{0.1})Na_{0.1}(Zr_{0.9}Ti_{0.1}) O_3$

Multilayer capacitors with a ceramic material according to the invention and copper inner electrodes positioned therebetween are therefore particularly well suited for use in space-saving circuits, since the self-warming is greatly reduced. In this manner, it is possible, for example, to position the multilayer capacitor between multiple semiconductor diodes and thus create a space-optimized structure with the smallest possible losses and minimized electromagnetic radiation.

The invention claimed is:

1. An antiferroelectric ceramic material with the formula

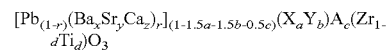

$[Pb_{(1-r)}(Ba_xSr_yCa_z)_r]_{(1-1.5a-1.5b-0.5c)}(X_aY_b)A_c(Zr_{1-d}Ti_d)O_3$ wherein X and Y are respectively a rare earth metal comprising at least one of La, Nd, Y, Eu, Gd, Tb, Dy, Ho, Er or Yb;

A represents a monovalent ion comprising Na, K, or Li;

x+y+z=1;

x and/or y and/or z>0;

$0 < r \leq 0.3$;

$0 \leq d \leq 1$;

$0 \leq a \leq 0.2$;

$0 \leq b \leq 0.2$;

$0 < c \leq 0.2$.

2. The ceramic material according to claim 1, wherein $0.01 \leq r \leq 0.2$.

3. The ceramic material according to claim 1, wherein $0.01 \leq x < 1$;
$0 \leq y \leq 0.99$;
$0 \leq z \leq 0.2$.

4. The ceramic material according to claim 3, wherein y and z=0;
$0.01 \leq r \leq 0.2$.

5. The ceramic material according to claim 1, wherein $0.01 \leq d \leq 0.70$.

6. The ceramic material according to claim 1, wherein X represents La and Y represents Nd.

7. A capacitor comprising a ceramic material according to claim 1.

8. A multilayer capacitor comprising at least one layer of a material according to claim 1.

9. The multilayer capacitor according to claim 8, wherein inner electrodes are formed from copper.

10. An inverter for a motor drive comprising a multilayer capacitor according to claim 8.

11. The ceramic material according to claim 1, wherein $0.03 \leq d \leq 0.52$.

12. A method for manufacturing a capacitor comprising positioning a ceramic material according to claim 1 between electrodes to reduce self-warming.

13. A method for manufacturing a multilayer capacitor comprising positioning at least one layer of a material according to claim 1 between electrodes or between multiple semiconductor diodes to reduce self-warming.

* * * * *